(12) United States Patent
Liew

(10) Patent No.: US 11,841,994 B1
(45) Date of Patent: Dec. 12, 2023

(54) OPTICAL NAVIGATION SYSTEM AND OPTICAL SENSOR CONTROL METHOD

(71) Applicant: PixArt Imaging Inc., Hsin-Chu (TW)

(72) Inventor: Tong Sen Liew, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/830,367

(22) Filed: Jun. 2, 2022

(51) Int. Cl.
*G06F 3/03* (2006.01)
*G06F 3/038* (2013.01)
*G06F 3/0354* (2013.01)

(52) U.S. Cl.
CPC ............ *G06F 3/0304* (2013.01); *G06F 3/038* (2013.01); *G06F 3/03543* (2013.01)

(58) Field of Classification Search
CPC ..... G06F 3/0304; G06F 3/03543; G06F 3/038
See application file for complete search history.

(56) References Cited

U.S. PATENT DOCUMENTS

| 10,684,974 | B1 * | 6/2020 | Wright | G06F 13/4022 |
| 11,188,495 | B2 * | 11/2021 | Rumpler | G06F 9/3012 |
| 2005/0235159 | A1 * | 10/2005 | Anandakumar | G06F 3/0383 |
| | | | | 710/72 |
| 2010/0042763 | A1 * | 2/2010 | Bica | G06F 3/038 |
| | | | | 710/62 |
| 2011/0148765 | A1 * | 6/2011 | Chuang | G06F 3/03543 |
| | | | | 345/166 |
| 2012/0072628 | A1 * | 3/2012 | Crockett | G06F 13/4291 |
| | | | | 710/110 |
| 2013/0057473 | A1 * | 3/2013 | Liang | G06F 3/0308 |
| | | | | 345/163 |
| 2013/0127720 | A1 * | 5/2013 | Chen | G06F 3/0304 |
| | | | | 710/110 |
| 2019/0122025 | A1 * | 4/2019 | Gove | G06V 40/1382 |

* cited by examiner

*Primary Examiner* — Ariel A Balaoing
(74) *Attorney, Agent, or Firm* — Winston Hsu

(57) ABSTRACT

An optical navigation system comprising: a control circuit; and an optical sensor, comprising a plurality of pins, wherein the optical sensor is configured to sense optical data and configured to compute motions according to the optical data. The optical sensor outputs the motions to the control circuit via a complex pin among the pins in a first mode. The optical sensor outputs data other than the motions to the control circuit via the complex pin in a second mode. The present invention also discloses an optical navigation system which shares a pin for receiving different types of data.

20 Claims, 4 Drawing Sheets

701 — Sense optical data and computing motions according to the optical data, by the optical sensor 703 — Output the motions via a first complex pin among the pins in a first mode, by the optical sensor 705 — Output data other than the motions to the control circuit via the first complex pin in a second mode, by the optical sensor

US 11,841,994 B1

OPTICAL NAVIGATION SYSTEM AND OPTICAL SENSOR CONTROL METHOD

BACKGROUND OF THE INVENTION

1. Field of the Invention

The present invention relates to an optical navigation system and an optical sensor control method, and particularly relates to an optical navigation system and an optical sensor control method which can share a pin of the optical sensor.

2. Description of the Prior Art

For an optical sensor which follows SPI (Serial Peripheral Interface) specification, the SPI communication pins and a motion pin are separated. However, for such structure, the number of SPI communication pins is limited. For example, if the optical sensor has 8 pins and only 4 pins are allocated to SPI communication pins and a motion pin, the number of the SPI communication pins is limited to 3 since one pin must be used as the motion pin.

Therefore, one pin of the SPI communication pins needs to operate as a pin which outputs necessary data from the optical sensor to a control circuit and a pin which receives necessary data from the control circuit to the optical sensor. For example, one pin of the SPI communication pins is used as an SDIO pin. However, the timing of data in such pin is hard to control. Further, an extra interface may need to be provided between the optical sensor has three pins and the control circuit.

SUMMARY OF THE INVENTION

One objective of the present invention is to provide an optical navigation system which can share a pin of the optical sensor.

Another objective of the present invention is to provide an optical sensor control method which can share a pin of the optical sensor.

One embodiment of the present invention discloses an optical navigation system comprising: a control circuit; and an optical sensor, comprising a plurality of pins, wherein the optical sensor is configured to sense optical data and configured to compute motions according to the optical data. The optical sensor outputs the motions to the control circuit via a complex pin among the pins in a first mode. The optical sensor outputs data other than the motions to the control circuit via the complex pin in a second mode.

Another embodiment of the present invention discloses an optical navigation system, comprising: a control circuit; and an optical sensor, comprising a plurality of pins. The optical sensor receives first type data from the control circuit via a complex pin among the pins in a first mode. The optical sensor receives second type data from the control circuit via the complex pin in a second mode.

Still another embodiment of the present invention discloses an optical sensor control method, applied to an optical sensor comprising a plurality of pins, comprising: sensing optical data and computing motions according to the optical data, by the optical sensor; outputting the motions via a first complex pin among the pins in a first mode, by the optical sensor; and outputting data other than the motions to the control circuit via the first complex pin in a second mode, by the optical sensor.

In view of above-mentioned embodiments, the pin of the optical sensor can be shared thus the control circuit and the optical sensor can connect directly without using an extra interface for connecting the control circuit with more SPI communication pins and the optical sensor initially with less SPI communication pins.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Figure 1:
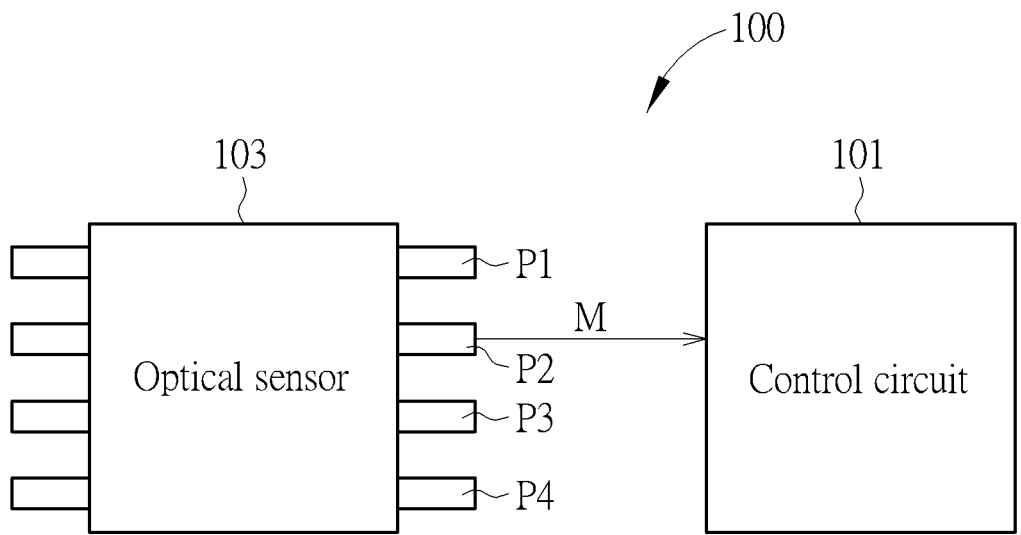
FIG. 1, FIG. 2, FIG. 3 and FIG. 4 are block diagrams illustrating different embodiments of the present invention.

FIG. 1, FIG. 2, FIG. 3 and FIG. 4 are block diagrams illustrating different embodiments of the present invention. As illustrated in FIG. 1, the optical navigation system 100 comprises a control circuit 101 (e.g., a microprocessor or MCU) and an optical sensor 103 (e.g., an image sensor). The optical sensor 103 comprises a plurality of pins P1, P2, P3, and P4. Please note, only four pins are symbolized in following embodiments. The optical sensor 103 is configured to sense optical data and configured to compute motions of the optical navigation system 100. In one embodiment, the optical sensor 103 is an image sensor and the optical data is images. In such case, the optical sensor 103 computes the motions of the optical navigation system 100 according to continuous images.

Figure 2:
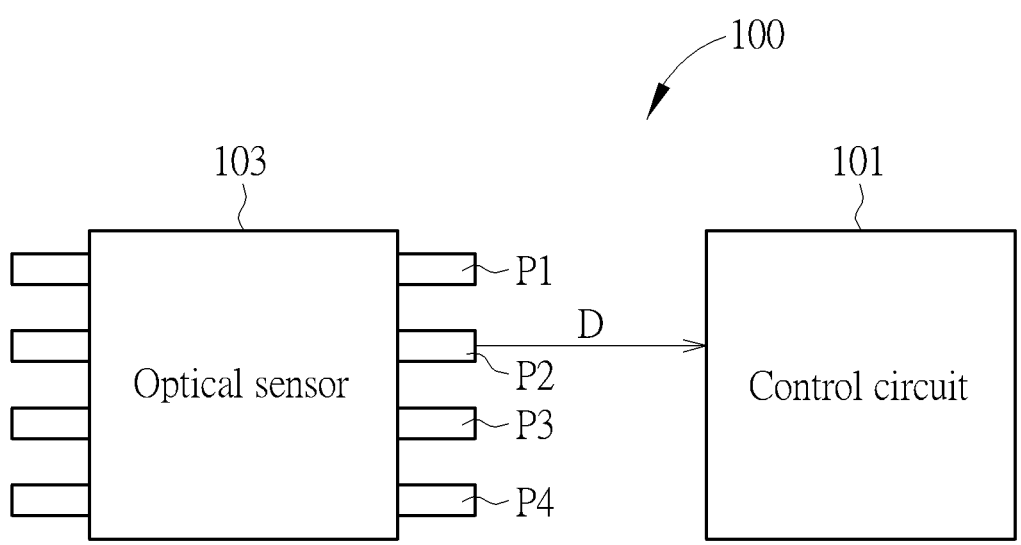

In the embodiments of FIG. 1 and FIG. 2, the pin P2 is a complex pin, which has different functions in different modes. As shown in FIG. 1, the optical sensor 103 outputs the motions M to the control circuit 101 via the pin P2 in a first mode. The optical sensor 103 does not output the data D (e.g., lift detection) to the control circuit 101 via the pin P2 in the first mode. Also, as shown in FIG. 2, the optical sensor 103 outputs data D other than the motions M to the control circuit 101 via the pin P2 in a second mode. The optical sensor 103 does not output the motions M to the control circuit 101 via the pin P2 in the second mode. Many methods can be applied to control the mode of the optical sensor 103. In one embodiment, a multiplexer can be provided in the optical sensor 103, to select the mode which the optical sensor 103 operates in.

Many methods can be applied to select the mode which the optical sensor 103 operates in. For example, one of the plurality of pins inputted as a first level defines the first mode and one of the plurality of pins inputted as a second level defines the second mode. In other words, if one of the plurality of pins receives a signal with a first level (e.g., 1), the optical sensor 103 operates in the first mode. Oppositely, if one of the plurality of pins receives a signal with a second level (e.g., 0), the optical sensor 103 operates in the second mode, wherein the one of the plurality of pins can be a NCS pin which describes as below. The pin which receives the signal with the first level and the pin which receives the signal with the second level can be the same pin (e.g., NCS pin), but can be different pins (e.g., NCS pin and SCLK pin) as well.

In one embodiment, the optical sensor 103 follows the SPI specification and the complex pin is a MISO (Master Input, Slave Output) pin. In such case, the control circuit 101 operates as a master device and the optical sensor 103 operates as a slave device. Further, in one embodiment, besides the complex pin, the SPI communication pins of the optical sensor 103 further comprises the NCS pin, a SCLK pin, and a MOSI (Master Output, Slave Input) pin. The NCS pin can be called a SPI chip select pin, which is used for receiving a command indicating which chip is to be read. The SCLK pin is used for receiving a clock signal. Also, the data transmission direction of the MOSI pin is opposite to the above-mentioned MISO pin. Thus, the SPI communication pins of the optical sensor 103 provided by the present invention comprises more pins (4 pins) than the SPI communication pins of a conventional optical sensor (3 pins).

In one embodiment, the optical sensor 103 further comprises a VDD pin, a VREG pin, a XYLED pin and a ground pin. The VDD pin is used for receiving an input power supply. The VREG pin is used for outputting a regulated power. The XYLED pin is used for controlling an LED in the optical navigation system 100. It will be appreciated that the optical sensor provided by the present invention is not limited to comprise the pins illustrated in FIG. 1 and FIG. 2.

Based on the embodiment illustrated in FIG. 1 and FIG. 2, the board design is easier when a control circuit with 4 SPI communication pins is used. The control circuit 101 and the optical sensor 103 can connect directly without using an extra interface for connecting the control circuit with 4 SPI communication pins and the optical sensor with 3 SPI communication pins. For more detail, for a type of the optical sensor, the optical sensor may have only 3 SPI communication pins. However, based on the embodiment illustrated in FIG. 1, the number of the SPI communication pins of the optical sensor can be extended to 4, thus the control circuit and the optical sensor can connect directly.

In the embodiments of FIG. 1 and FIG. 2, the optical sensor 103 has a complex pin for outputting different types of data in different modes. However, in another embodiment, the optical sensor 103 has a complex pin for receiving different types of data in different modes. Such embodiment is described in following FIG. 3 and FIG. 4.

Figure 3:
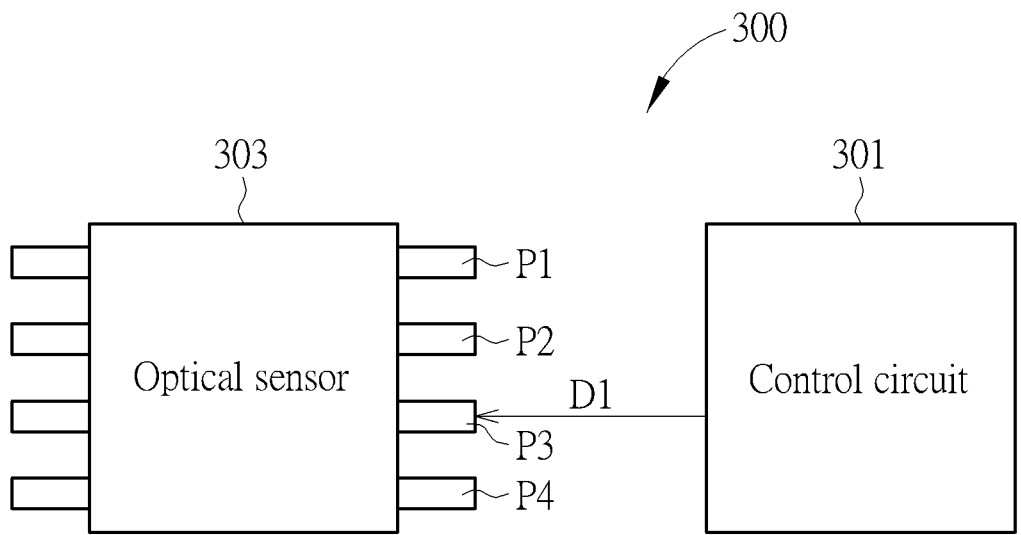
Figure 4:
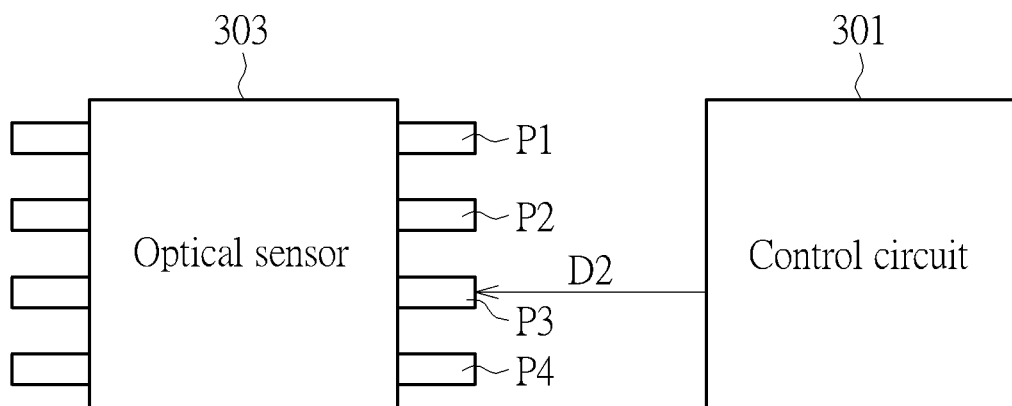

As illustrated in FIG. 3, the optical navigation system 100 comprises a control circuit 301 (e.g., a microprocessor or MCU) and an optical sensor 303. The optical sensor 303 comprises a plurality of pins P1, P2, P3, and P4. In one embodiment, the optical sensor 103 is an image sensor and the optical data is images. In the embodiments of FIG. 3 and FIG. 4, the pin P3 is a complex pin, which has different functions in different modes. Specifically, the optical sensor 103 receives first type data D1 from the control circuit 101 via the pin P3 in a first mode, as shown in FIG. 3. Besides, the optical sensor 103 receives second type data D2 from the control circuit 101 via the pin P3 in a second mode, as shown in FIG. 4. The optical sensor 103 does not receive the second type data D2 via the pin P3 in the first mode, and does not receive the first type data D1 via the pin P3 in the second mode. Please note, the first mode, the second mode in FIG. 1, FIG. 2 are independent from the first mode, the second mode in FIG. 3, FIG. 4.

In one embodiment, the optical sensor 303 follows the SPI specification and the complex pin is a MOSI pin. Specifically, the pin P3 operates as the MOSI pin in the first mode, and receives the second type data in the second mode. In one embodiment, the SPI communication pins of the optical sensor 303 further comprises a NCS pin, a SCLK pin, and a MISO pin. The functions of the MOSI pin, the NCS pin, the SCLK pin, and the MISO pin are described in above-mentioned embodiments, thus are omitted for brevity here.

In one embodiment, the second type data D2 is a trigger signal for waking up the optical sensor. In such case, the first type data D1 is not the trigger signal and can be any data which the control circuit 301 needs to or is requested to send to data. For some optical navigation systems, the optical sensor operates in a sleep mode if the optical navigation system does not move or no object is detected for a predetermined time interval. After entering the sleep mode, the optical sensor needs to be waked up to enter an active mode. The optical sensor normally sense images and consumes more power in the active mode. Also, the optical sensor sense images with lower resolutions or does not sense images, and consumes less power in the sleep mode. One method for waking up the optical sensor is that the optical navigation system moves such that the optical sensor sense images indicating the movement.

Another method for waking up the optical sensor is that the control circuit sends the above-mentioned trigger signal to wake up the optical sensor. In one embodiment, the optical sensor wakes up after receives the trigger signal for a predetermined time interval. In another embodiment, the trigger signal is used for immediately waking up the optical sensor. Such embodiment can be applied to an optical navigation system needs high performance. For example, such embodiment can be applied to a gaming optical mouse.

Many mechanisms can be applied to start the generation of the trigger signal. For example, the optical navigation system may have a trigger region such as a button or a touch region, and the control circuit generates the trigger signal if a user touches or presses the trigger region. For another example, the optical navigation system may have a gyro or an accelerator, and the movement of the optical navigation system can be sensed by the gyro or the accelerator, to trigger the generation of the trigger signal.

In one embodiment, the optical sensor 303 in FIG. 3 and FIG. 4 further comprises a VDD pin, a VREG pin, a XYLED pin and a ground pin. Functions of the VDD pin, the VREG pin, the XYLED pin and the ground pin are described in the embodiments of FIG. 1 and FIG. 2, thus are omitted for brevity here. It will be appreciated that the optical sensor provided by the present invention is not limited to comprise the pins illustrated in FIG. 3 and FIG. 4.

The embodiment illustrated in FIG. 1, FIG. 2, and the embodiment illustrated in FIG. 3, FIG. 4 can be combined. In such combination, the optical navigation system can comprise a first complex pin (e.g., the pin P2 in FIG. 1, FIG. 2) and a second complex pin (e.g., the pin P2 in FIG. 3, FIG. 4). As above-mentioned, the first complex pin selectively output motions and data other than the motions in different modes. Besides, the second complex pin selectively receives first type data and the second type data from the control circuit in different modes.

Figure 5:
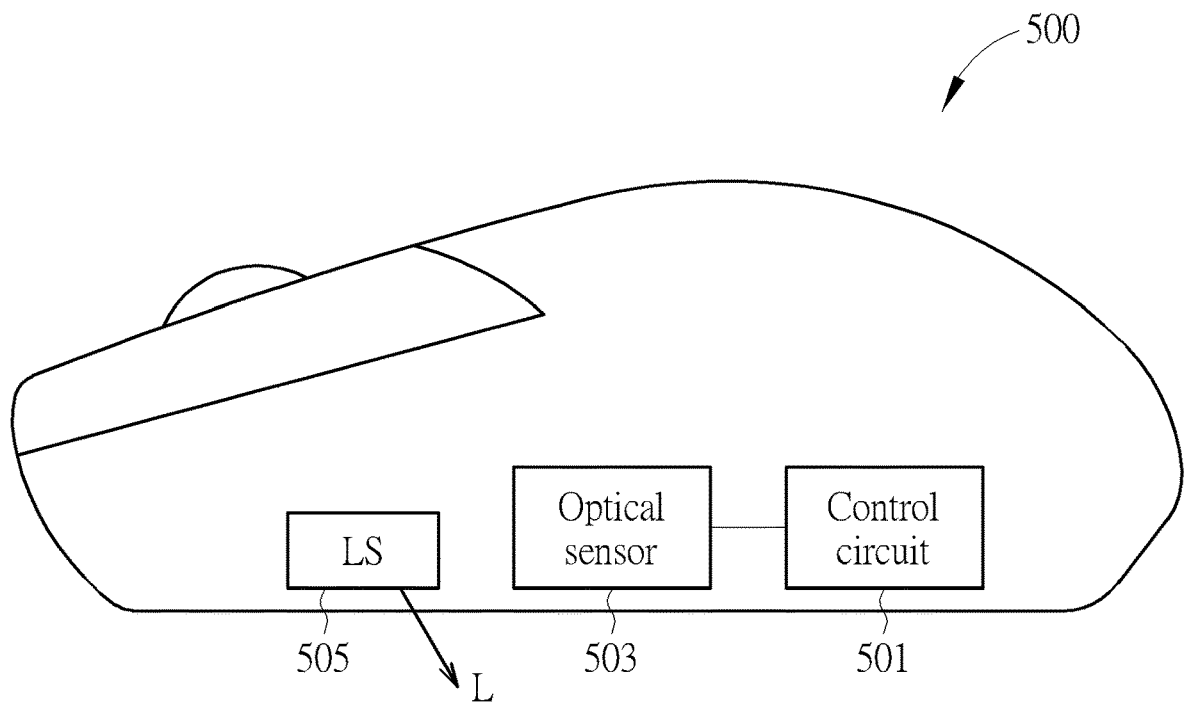
FIG. 5 and FIG. 6 are examples of the optical navigation systems according to different embodiments of the present invention.
Figure 6:
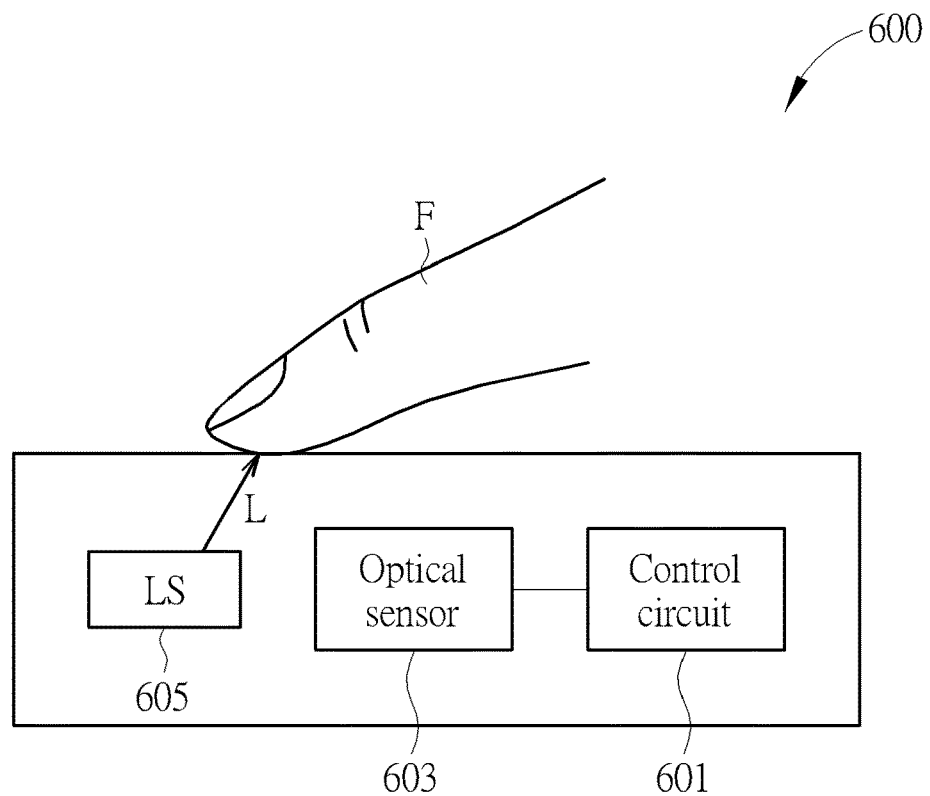

The above-mentioned embodiments can be applied to various types of navigation devices. FIG. 5 and FIG. 6 are examples of the optical navigation systems according to different embodiments of the present invention. In the embodiment of FIG. 5, the optical navigation system is an optical mouse 500. As shown in FIG. 5, the optical mouse 500 comprises a control circuit 501, an optical sensor 503 and a light source 505. The optical sensor 503 has the structure illustrated in FIG. 1, FIG. 2 and/or the structure in FIG. 3, FIG. 4. The light source 505 is configured to emit light L and the optical sensor 503 is configured to sense images generated according to the light L. Also, the optical sensor 503 is configured to compute motions according to the images and to output the motions to the control circuit 501. By this way, the movement of the optical mouse 500 can be detected.

In the embodiment of FIG. 6, the optical navigation system is an optical touch device 600. As shown in FIG. 6, the optical touch device 600 comprises a control circuit 601, an optical sensor 603 and a light source 605. The optical sensor 603 has the structure illustrated in FIG. 1, FIG. 2 and/or the structure in FIG. 3, FIG. 4. The light source 605 is configured to emit light L and the optical sensor 603 is configured to sense images generated according to the light L. Also, the optical sensor 603 is configured to compute motions according to the images and to output the motions to the control circuit 601. By this way, the movement of an object such as the finger F can be detected.

Figure 7:
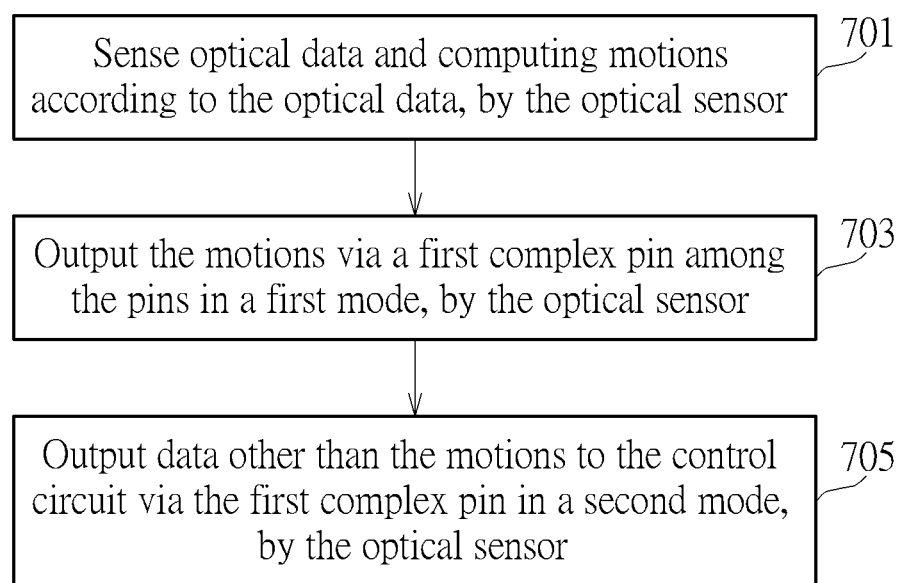
FIG. 7 is a flow chart illustrating an optical sensor control method according to one embodiment of the present invention.

In view of above-mentioned embodiments, an optical sensor control method can be acquired. FIG. 7 is a flow chart illustrating an optical sensor control method according to one embodiment of the present invention, which corresponds to the embodiments illustrated in FIG. 1, FIG. 2 and comprises following steps:

Step 701

Sense optical data and computing motions according to the optical data, by the optical sensor.

Step 703

Output the motions via a first complex pin among the pins in a first mode, by the optical sensor.

Step 705

Output data other than the motions to the control circuit via the first complex pin in a second mode, by the optical sensor.

If the embodiment of FIG. 7, it can further comprising following steps: receiving first type data from the control circuit via a second complex pin among the pins in a third mode; receiving second type data from the control circuit via the second complex pin in a fourth mode. These steps correspond to embodiments in FIG. 3 and FIG. 4.

Other detail steps can be acquired in view of above-mentioned embodiments, thus are omitted for brevity here.

In view of above-mentioned embodiments, the pin of the optical sensor can be shared thus the control circuit and the optical sensor can connect directly without using an extra interface for connecting the control circuit with more SPI communication pins and the optical sensor initially with less SPI communication pins.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An optical navigation system, comprising:
   a control circuit; and
   an optical sensor, comprising a plurality of pins, wherein the optical sensor is configured to sense optical data and configured to compute motions according to the optical data;
   wherein the optical sensor outputs the motions to the control circuit via a complex pin among the pins in a first mode;
   wherein the optical sensor outputs data other than the motions to the control circuit via the complex pin in a second mode.

2. The optical navigation system of claim 1, wherein the optical sensor follows a SPI specification and the complex pin is a MISO pin.

3. The optical navigation system of claim 2, wherein the optical sensor further comprises a NCS pin, a SCLK pin, and a MOSI pin.

4. The optical navigation system of claim 1, wherein one of the plurality of pins inputted as a first level defines the first mode.

5. The optical navigation system of claim 4, wherein the one of the plurality of pins inputted as a second level defines the second mode.

6. An optical navigation system, comprising:
   a control circuit; and
   an optical sensor, comprising a plurality of pins;
   wherein the optical sensor receives first type data from the control circuit via a complex pin among the pins in a first mode;
   wherein the optical sensor receives second type data from the control circuit via the complex pin in a second mode.

7. The optical navigation system of claim 6, wherein the optical sensor follows a SPI specification and the complex pin is a MOSI pin.

8. The optical navigation system of claim 7, wherein the complex pin operates as the MOSI pin in the first mode, and receives the second type data in the second mode.

9. The optical navigation system of claim 7, wherein the optical sensor further comprises a NCS pin, a SCLK pin, and a MISO pin.

10. The optical navigation system of claim 6, wherein the second type data is a trigger signal for waking up the optical sensor.

11. The optical navigation system of claim 10, wherein the trigger signal is used for immediately waking up the optical sensor.

12. An optical sensor control method, applied to an optical sensor comprising a plurality of pins, comprising:
    sensing optical data and computing motions according to the optical data, by the optical sensor;
    outputting the motions via a first complex pin among the pins in a first mode, by the optical sensor; and
    outputting data other than the motions to the control circuit via the first complex pin in a second mode, by the optical sensor.

13. The optical sensor control method of claim 12, wherein the optical sensor follows a SPI specification and the first complex pin is a MISO pin.

14. The optical sensor control method of claim 13, wherein the optical sensor further comprises a NCS pin, a SCLK pin, and a MOSI pin.

15. The optical sensor control method of claim 12, further comprising:
- receiving first type data from the control circuit via a second complex pin among the pins in a third mode;
- receiving second type data from the control circuit via the second complex pin in a fourth mode.

16. The optical sensor control method of claim 15, wherein the optical sensor follows a SPI specification and the second complex pin is a MOSI pin.

17. The optical sensor control method of claim 16, further comprising:
- using the second complex pin as the MOSI pin in the third mode, and receiving the second type data via the second complex pin in the fourth mode.

18. The optical sensor control method of claim 16, wherein the optical sensor further comprises a NCS pin, a SCLK pin, and a MISO pin.

19. The optical sensor control method of claim 16, wherein the second type data is a trigger signal for waking up the optical sensor.

20. The optical sensor control method of claim 19, wherein the trigger signal is used for immediately waking up the optical sensor.

\* \* \* \* \*